United States Patent
Hanslik et al.

(10) Patent No.: US 11,618,448 B2
(45) Date of Patent: Apr. 4, 2023

(54) CONTROL ARRANGEMENT FOR ADJUSTING A DISTANCE BETWEEN TWO VEHICLES AND METHOD FOR ADJUSTING A DISTANCE BETWEEN TWO VEHICLES USING A CONTROL ARRANGEMENT OF THIS KIND

(71) Applicant: WABCO GmbH, Hannover (DE)

(72) Inventors: Daniel Hanslik, Isernhagen (DE); Soeren Huebner, Varel (DE); Thomas Wolf, Barsinghausen (DE)

(73) Assignee: ZF CV SYSTEMS EUROPE BV, Brussels (BE)

(*) Notice: Subject to any disclaimer, the term of this patent is extended or adjusted under 35 U.S.C. 154(b) by 270 days.

(21) Appl. No.: 16/607,722

(22) PCT Filed: Apr. 12, 2018

(86) PCT No.: PCT/EP2018/059422
§ 371 (c)(1),
(2) Date: Oct. 24, 2019

(87) PCT Pub. No.: WO2018/210496
PCT Pub. Date: Nov. 22, 2018

(65) Prior Publication Data
US 2020/0130689 A1    Apr. 30, 2020

(30) Foreign Application Priority Data
May 17, 2017 (DE) .......................... 102017004741.3

(51) Int. Cl.
*B60W 30/16* (2020.01)
*G08G 1/0967* (2006.01)
*G08G 1/00* (2006.01)

(52) U.S. Cl.
CPC ....... *B60W 30/16* (2013.01); *G08G 1/096791* (2013.01); *G08G 1/22* (2013.01);
(Continued)

(58) Field of Classification Search
CPC ............. B60W 30/16; B60W 2555/60; B60W 2556/65; B60W 2554/802; B60W 2520/105; G08G 1/096791; G08G 1/22
See application file for complete search history.

(56) References Cited

U.S. PATENT DOCUMENTS 6,076,622 A * 6/2000 Chakraborty ...... B60K 31/0008
180/169
11,119,477 B1 * 9/2021 Konrardy ............. G05D 1/0214
(Continued)

FOREIGN PATENT DOCUMENTS

| CN | 103026397 A | 4/2013 |
|----|----|----|
| DE | 10254583 A1 | 6/2004 |

(Continued)

*Primary Examiner* — Hussein Elchanti
(74) *Attorney, Agent, or Firm* — Leydig, Voit & Mayer, Ltd.

(57) ABSTRACT

A control arrangement for adjusting a desired distance between two vehicles includes a distance regulation system having a distance control device configured to adjust a first desired distance between a subject vehicle and a vehicle ahead depending on sensor signals received from a sensor system by requesting a first subject vehicle desired acceleration. The control arrangement further includes a communication system configured to wirelessly send and receive a surroundings data signal. The surroundings data signal contains surroundings information. The control arrangement additionally includes an assistance control device configured to determine a second desired distance between the subject vehicle and the vehicle ahead and a second subject vehicle desired acceleration for adjusting the second desired distance depending on the surroundings information received (Continued)

from the communication system. The distance control system comprises an ACC interface. A first interface signal is transferred via the ACC interface to the distance regulation system.

14 Claims, 2 Drawing Sheets

(52) U.S. Cl.
CPC . *B60W 2520/105* (2013.01); *B60W 2554/802* (2020.02); *B60W 2555/60* (2020.02); *B60W 2556/65* (2020.02)

(56) References Cited

U.S. PATENT DOCUMENTS

| | | | |
|---|---|---|---|
| 2003/0225495 A1* | 12/2003 | Coelingh | B60W 10/04 701/48 |
| 2004/0084237 A1* | 5/2004 | Petrie, Jr. | B60K 31/04 180/170 |
| 2004/0195022 A1* | 10/2004 | Inoue | B60K 31/0008 180/170 |
| 2008/0243351 A1* | 10/2008 | Isogai | B60W 30/16 701/96 |
| 2009/0228184 A1* | 9/2009 | Ueyama | G08G 1/161 701/96 |
| 2010/0004848 A1* | 1/2010 | Transou, Jr. | B60W 30/143 701/110 |
| 2010/0191436 A1* | 7/2010 | Hellmann | B60W 30/146 701/96 |
| 2010/0256836 A1 | 10/2010 | Mudalige | |
| 2010/0280729 A1* | 11/2010 | Samsioe | B60W 10/196 701/93 |
| 2011/0035135 A1* | 2/2011 | Schwalm | B60W 10/08 701/110 |
| 2011/0238272 A1* | 9/2011 | Kato | B60W 30/14 701/55 |
| 2012/0191318 A1 | 7/2012 | Holzmann et al. | |
| 2013/0096808 A1* | 4/2013 | DeLaSalle | F02D 41/0225 701/110 |
| 2013/0116861 A1 | 5/2013 | Nemoto | |
| 2013/0226431 A1* | 8/2013 | Lu | B60W 50/0098 701/96 |
| 2016/0001781 A1* | 1/2016 | Fung | B60K 28/02 701/36 |
| 2016/0054735 A1 | 2/2016 | Berdichevsky et al. | |
| 2016/0121890 A1* | 5/2016 | Han | B60W 30/16 701/93 |
| 2016/0163198 A1* | 6/2016 | Dougherty | G08G 1/162 340/905 |
| 2016/0229397 A1* | 8/2016 | Muthukumar | B60W 10/20 |
| 2016/0297434 A1* | 10/2016 | Merzig | B60W 30/16 |
| 2017/0144617 A1* | 5/2017 | Lee | B60K 31/0008 |
| 2017/0282917 A1* | 10/2017 | Pilutti | B60K 35/00 |
| 2017/0369055 A1* | 12/2017 | Saigusa | G08G 1/0116 |
| 2018/0001892 A1* | 1/2018 | Kim | B60W 30/16 |
| 2018/0037227 A1* | 2/2018 | D'sa | B60W 50/045 |
| 2018/0190128 A1* | 7/2018 | Saigusa | B60W 40/04 |

FOREIGN PATENT DOCUMENTS

| | | |
|---|---|---|
| DE | 102008036131 A1 | 3/2009 |
| DE | 102008061303 A1 | 6/2009 |
| DE | 102010013647 B4 | 5/2012 |
| EP | 2481650 A1 | 8/2012 |

* cited by examiner

CONTROL ARRANGEMENT FOR ADJUSTING A DISTANCE BETWEEN TWO VEHICLES AND METHOD FOR ADJUSTING A DISTANCE BETWEEN TWO VEHICLES USING A CONTROL ARRANGEMENT OF THIS KIND

CROSS REFERENCE TO RELATED APPLICATIONS

This application is a U.S. National Phase application under 35 U.S.C. § 371 of International Application No. PCT/EP2018/059422, filed on Apr. 12, 2018, and claims benefit to German Patent Application No. DE 10 2017 004 741.3, filed on May 17, 2017. The International Application was published in German on Nov. 22, 2018 as WO 2018/210496 under PCT Article 21(2).

FIELD

The invention relates to a control arrangement for adjusting a distance between two vehicles, in particular commercial vehicles, and a method for adjusting a distance between two vehicles with such a control arrangement.

BACKGROUND

In vehicles, in particular commercial vehicles, a distance regulation system —conventionally referred to as adaptive cruise control (ACC)—is used, with which a first desired distance between a vehicle and a vehicle directly ahead thereof that is manually specified by the driver can be adjusted. For this purpose, a first subject vehicle desired acceleration is specified by a distance control device of the distance regulation system and said first subject vehicle desired acceleration is adjusted by a brake system or a drive system of the subject vehicle in order to adjust to the specified first desired distance. The distance regulation system is an externally closed system, i.e. it is not provided that distance requirements or acceleration requirements can be received from external systems. Only sensor signals from sensors disposed in the vehicle can be received and processed in order to incorporate current driving dynamics information regarding the vehicle surroundings, for example a current actual distance from the respective vehicle ahead.

For driving in a platoon, in which several vehicles move in a coordinated column, a platooning control device is conventionally provided in the subject vehicle, which adequately controls the subject vehicle on the basis of detected driving dynamics information for the subject vehicle and the current vehicle surroundings in order to ensure safe and very fuel-efficient operation of the subject vehicle while travelling in a platoon. To this end, the platooning control device calculates requirements for vehicle control from the driving dynamics information and outputs said information directly to the braking system or the drive system in order to operate the subject vehicle as calculated and thus to adjust a desired driving behavior within the platoon. In this case, the platooning control device specifies a second subject vehicle desired acceleration for adjusting a second desired distance to the vehicle ahead.

In US 2016/0054735A1 a platooning control device is revealed, with which the subject vehicle can be controlled in a safe and reliable manner within a platoon, wherein the driving behavior of other vehicles in the vehicle surroundings of the subject vehicle is monitored with sensors. In addition, wireless data communication between the vehicles of the platoon is provided that allows the driving behavior of the vehicles to be coordinated. In doing so, driving dynamics information is exchanged and based thereon the platooning control device in the respective vehicle determines a second subject vehicle desired acceleration or a subject vehicle desired speed and outputs the same to the braking system or drive system in order to regulate a determined second desired distance between the subject vehicle and the respective vehicle ahead.

DE 10 2010 013 647 B4 describes a platoon with a control vehicle, which is coordinating the platoon, and other vehicles, wherein the control vehicle in particular specifies position assignments and speed specifications and thus desired distances to the other vehicles, which implement these requirements. The requirements are transmitted via wireless communication to the individual vehicles, which are then coordinated accordingly by a platooning control device by intervening in the brakes or the drive.

SUMMARY

In an embodiment, the present invention provides a control arrangement for adjusting a desired distance between two vehicles. The control arrangement includes a distance regulation system having a distance control device configured to adjust a first desired distance between a subject vehicle and a vehicle ahead depending on sensor signals received from a sensor system by requesting a first subject vehicle desired acceleration. The control arrangement further includes a communication system configured to wirelessly send and receive a surroundings data signal, wherein the surroundings data signal contains surroundings information, and an assistance control device configured to determine a second desired distance between the subject vehicle and the vehicle ahead and a second subject vehicle desired acceleration for adjusting the second desired distance depending on the surroundings information received from the communication system. The distance control system comprises an ACC interface. A first interface signal is transferred via the ACC interface to the distance regulation system, and the first interface signal is formed depending on the surroundings information received from the communication system and the second desired distance determined by the assistance control device is adjusted by the distance regulation system taking into account the first interface signal.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
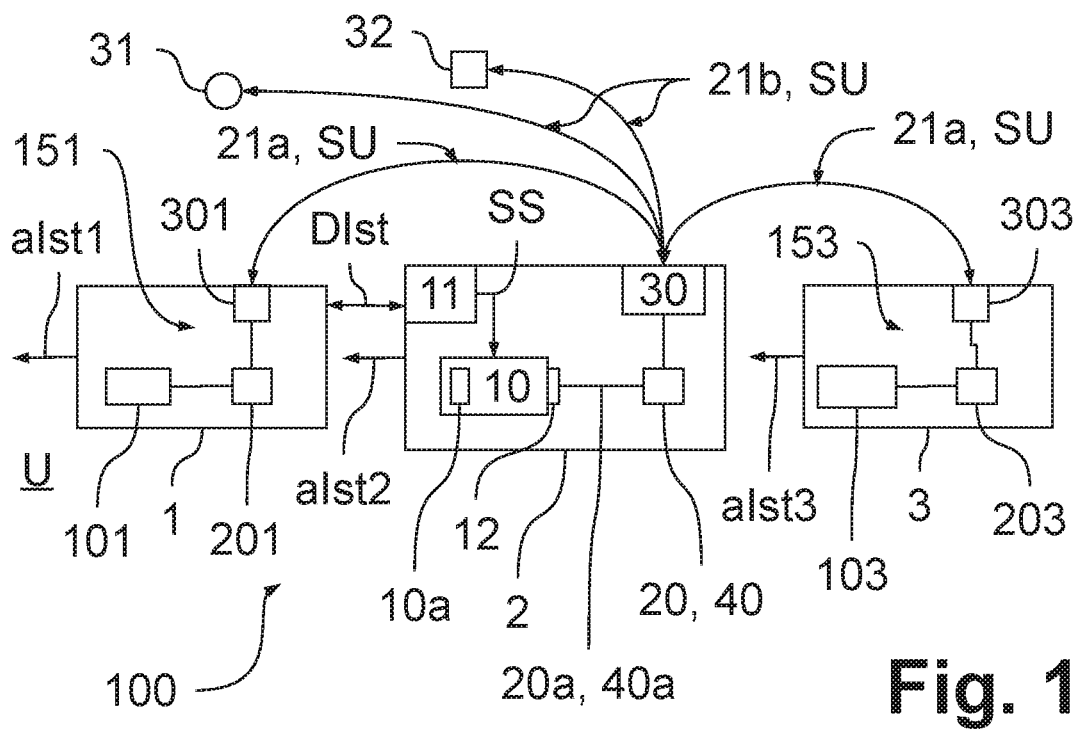
FIG. 1 shows a schematic view of a platoon.

A disadvantage of the above described platooning systems is that the implementation of a specified second subject vehicle desired acceleration to achieve a specified second desired distance between the subject vehicle and the respective vehicle ahead is carried out by a separate system in the vehicle. If there is already a standalone distance regulation system in the subject vehicle, then in addition to this distance regulation system there are further control components for controlling the brakes or the drive in the subject vehicle, but which will control the subject vehicle according to a specification of a desired distance in a comparable way to a distance regulation system.

Thus, components with the same functionality are double-installed in the subject vehicle. This increases the installation effort and cost. In this case, coordination of the different systems is required in order to avoid unintentional oversteering or overriding of the requirements of the systems and thus to avoid risking an unsafe state of the subject vehicle. This increases the processing time of the system, which can result in delayed output of requirements.

The invention provides control arrangements for adjusting a distance between two vehicles with which simple and reliable control can be carried out. Furthermore, the invention specifies methods for adjusting a distance between two vehicles with the control arrangement.

According to the invention, an additional ACC interface can be arranged on a distance regulation system in a vehicle, wherein a first interface signal can be transferred to the control system via the ACC interface, wherein the first interface signal is formed depending on surroundings information received wirelessly by means of a surroundings data signal by a communication system in the vehicle and a second desired distance determined by an assistance control device is adjusted by the distance regulation system while taking into account or depending on the first interface signal.

In this case, the distance regulation system is a control system that comprises a distance control device that performs the calculations and data processing, and that is provided for adjusting or regulating a first desired distance between the subject vehicle and a vehicle directly ahead that is preferably manually specified by the driver. Depending on the sensor signals received from a sensor system, the distance regulation system requires a first subject vehicle desired acceleration in order to adjust a currently existing actual distance to the first desired distance. Thus, the distance regulation system is a conventional control system present in the vehicle, in particular a commercial vehicle, which is normally self-contained, i.e. it operates independently without resorting to external requirements.

According to the invention, this normally self-contained or autonomous distance regulation system can be extended by the ACC interface, so that advantageously requirements for the regulation of a desired distance, in particular the second desired distance determined by the assistance control device, also depending on surroundings information, can be transmitted to the distance regulation system. The distance control by means of the distance regulation system can then also be carried out depending on the information wirelessly transmitted to the subject vehicle, so that additional data or information can be used advantageously in addition to the sensor signals.

As a result, the safety and reliability of the distance regulation are increased by taking into account information that is not captured by the sensors of a conventional distance regulation system or is only captured at a later stage. For example, an emergency braking initiated by the vehicle ahead can be reacted to in anticipation if the requirement to initiate emergency braking is already transmitted wirelessly from the vehicle ahead to the subject vehicle as surroundings information and, depending on the data, the first interface signal is transmitted via the ACC interface to the distance control system, which then responds thereto with distance control.

For the purpose of adjusting the second desired distance, a second subject vehicle desired acceleration, which is dependent on the surroundings information, is specified to the distance control device. The second subject vehicle desired acceleration is determined depending on the first interface signal—preferably by the distance control device—and is applied by the brakes and/or a drive of the subject vehicle according to the requirement in order to implement said second subject vehicle desired acceleration. The subject vehicle desired acceleration can therefore be positive or negative.

In this case, the communication system is embodied to enable wireless communication between the subject vehicle and another vehicle in the vehicle surroundings, for example a vehicle ahead and/or a vehicle behind, i.e. for example, to enable wireless vehicle-vehicle (V2V) data communication. In addition, wireless data communication between the vehicle and infrastructure devices can be achieved, i.e. for example, a vehicle-infrastructure (V2I) data communication. The communication system can therefore preferably be embodied as a V2X communication system (V2V and/or V2I). This provides an easy way to get the surroundings information that is relevant for distance control from the vehicle surroundings.

According to a first embodiment, it is provided to determine the second subject vehicle desired acceleration and the second desired distance outside the distance regulation system in the assistance control device and to output the same to the ACC interface, so that the second subject vehicle desired acceleration and the second desired distance can be transmitted internally from the ACC interface by means of the first interface signal to the distance control device, which can then send a corresponding requirement to the brakes and/or the drive. That is, in this embodiment, the first interface signal transfers the variables, the second desired distance and the second vehicle desired acceleration, which are dependent on the surroundings information, using which the distance control device can adjust the second desired distance according to the specification of the assistance control device.

For this purpose, the assistance control device disposed outside the distance regulation system is preferably connected via an assistance data line to the ACC interface for signal transmission in order to be able to transmit the second desired distance determined by the assistance control device as well as the second subject vehicle desired acceleration to the ACC interface, so that the same can be transmitted by means of the first interface signal to the distance control device.

Advantageously, as a result a control arrangement is provided that can be easily retrofitted, since an existing distance regulation system in the vehicle is only to be extended with an ACC interface and the assistance control device is to be connected thereto.

According to an alternative embodiment, the assistance control device is integrated into the distance regulating system, for example constructively or as a software adaptation of the distance control device. The assistance control device is then connected internally to the distance control device via an assistance data line in order to transmit the second desired distance determined by the assistance control device as well as the second subject vehicle desired acceleration to the distance control device.

In this case, the ACC interface is connected to the assistance control device for signal transmission and the first interface signal transfers the surroundings information, which is received from the communication system and preferably transmitted via a communication data line to the ACC interface, to the assistance control device preferably unprocessed, so that depending thereon the assistance control device can carry out the calculation of the second desired distance as well as the second subject vehicle desired acceleration and on the basis thereof the distance control can be carried out by the distance control device.

Advantageously, as a result a compact control arrangement is provided that requires less installation effort during installation. With a pure software adaptation, only an interface extension is necessary, whereby the effort for retrofitting can be further reduced.

Surroundings information, which is processed by the assistance control device to specify the second desired distance or the second subject vehicle desired acceleration, is preferably a vehicle ahead actual acceleration and/or a vehicle behind actual acceleration and/or a vehicle ahead desired acceleration and/or a vehicle behind desired acceleration and/or a vehicle ahead brake performance parameter and/or a vehicle behind brake parameter and/or the approach to a junction, a traffic light, a tailback, a construction site or a speed limit.

All this information from the surroundings can have a direct or direct influence on the driving dynamics of the subject vehicle and therefore advantageously enables safe and reliable distance control when adjusting the second desired distance with the specified second subject vehicle desired acceleration.

Preferably, when determining the second subject vehicle desired acceleration and the second desired distance, further subject vehicle information, in particular a subject vehicle actual acceleration and/or the first or second subject vehicle desired acceleration and/or a subject vehicle brake performance parameter are taken into account, wherein the assistance control device is connected to a CAN bus in the subject vehicle for this purpose, which provides the subject vehicle information. As a result, the distance control can be further improved, as the subject vehicle driving dynamics are also taken into account.

According to a preferred embodiment, a second interface signal can be output via the ACC interface, wherein the second interface signal transfers the subject vehicle information and the second interface signal can be transmitted to the communication system. As a result, the subject vehicle information can be advantageously provided wirelessly to other vehicles or to the infrastructure devices in the vehicle surroundings.

According to a preferred embodiment, the sensor signals captured by the sensor system of the distance regulation system in the subject vehicle can also be transmitted by means of the second interface signal. As a result, additional information that is captured by the sensors can advantageously be provided wirelessly to the other vehicles or the infrastructure devices in the vehicle surroundings.

According to an advantageous embodiment, the control arrangement is equipped with a platooning control device as an assistance control device. The platooning control device coordinates the subject vehicle within a platoon of several vehicles, wherein the platooning control device determines the second desired distance and the second subject vehicle desired acceleration depending on the surroundings information for adjusting the second desired distance and outputs the same to the distance regulation system for the distance control.

As a result, a distance regulation system with an ACC interface according to the invention can be used advantageously in a platooning mode to regulate the distance from a vehicle ahead. As a result, conventionally available control systems in the vehicle can be used, so that duplicate or parallel components for adjusting a distance can be avoided in the vehicle. In this case, the distance between two vehicles in the platoon is adjusted depending on the wirelessly transmitted surroundings information, i.e. only with the distance regulation system extended by an ACC interface. This allows the coordination of individual control systems with which the distance can be adjusted to be avoided.

According to the invention, the control arrangement can therefore be used, following the capture of surroundings information via the communications system, to determine a second desired distance and a second subject vehicle desired acceleration depending on the captured surroundings information and to use the same as a specification for a distance control system in the subject vehicle in order to adjust the second desired distance depending on the surroundings information.

If a first desired distance has already been manually specified to the control system and a second desired distance is then transmitted from the assistance control device, the first desired distance is overwritten. The specification of the assistance control device therefore has a higher priority.

Preferably, a plausibility check in the distance regulation system can also take place by comparing the second subject vehicle desired acceleration specified by the assistance control device for adjusting the second desired distance with the first subject vehicle desired acceleration determined using the sensor signals of the sensor system in the distance regulation system. This allows, for example, a warning signal or the like to be issued in the event of a driving-critical deviation.

In FIG. 1, three vehicles 1, 2, 3 of a platoon or convoy 100 are shown schematically, which are moving in a coordinated manner in a column. The left vehicle is referred to below as the vehicle ahead 1, the middle vehicle as the subject vehicle 2 and the right vehicle that is directly following the subject vehicle 2 as the vehicle behind 3. The platoon 100 can also consist of only two vehicles or more than three vehicles, however.

The subject vehicle 2 comprises a distance regulation system 10 with a distance regulating controller 10a, which is also known as adaptive cruise control (ACC). The distance regulation system 10 ensures in a control loop that a specified desired distance DSoll_A, DSoll_B between the subject vehicle 2 and the immediately leading vehicle ahead 1 is adjusted by demanding a specified subject vehicle desired acceleration aSoll2_A, aSoll2_B from the brakes and/or the drive of the subject vehicle 2.

A first desired distance DSoll_A can be adjusted manually by the driver of the subject vehicle 2 and a second desired distance DSoll_B, for example, by a platooning control device 20 in the subject vehicle 2, which coordinates and controls the subject vehicle 2 while travelling in a platoon 100. A first subject vehicle desired acceleration aSoll2_A for adjusting the first desired distance DSoll_A is specified by the distance regulation system 10 itself or by the distance control device 10a, for example based on parameterization specified for the subject vehicle 2. According to this exemplary embodiment, a second subject vehicle desired acceleration aSoll2_B for adjusting the second desired distance DSoll_B is specified by the platooning control device 20.

In normal driving mode, i.e. if the subject vehicle 2 is moving outside of a platoon 100 independently of the other vehicles 1, 3, the driver can activate the distance regulation system 10 manually and can specify any first desired distance DSoll_A for this. First a current actual distance DIst from the vehicle ahead 1 is determined by the distance regulation system 10 in the distance control device 10$a$ using sensor signals SS output by a sensor system 11, e.g. with a radar sensor and/or an ultrasound sensor and/or a camera. In response thereto a first subject vehicle desired acceleration aSoll2_A is specified by the distance control device 10$a$ and is then implemented by an automated braking intervention in the subject vehicle 2 caused by the distance regulation system 10. In this way the current actual distance DIst from the vehicle ahead 1 is regulated in a control loop to the manually adjusted first desired distance DSoll_A. In addition, depending on the sign of the first subject vehicle desired acceleration aSoll_A, an engine intervention is also possible to automatically approach the vehicle ahead 1 if said vehicle ahead 1 is faster, for example. The distance regulation system 10 can therefore specify both a positive (accelerating) acceleration and also a negative (decelerating) acceleration.

If a platooning mode PM is activated for the subject vehicle 2, in which the vehicles 1, 2, 3 move in a coordinated column, a second desired distance DSoll_B is determined by the platooning control device 20 in the subject vehicle 2 and is transferred to the distance control device 10$a$. A manually specified first desired distance DSoll_A can be automatically overwritten in this case if the platooning control device 20 were to be given a higher priority than the manual specification.

In the activated platooning mode PM, on the basis of driving dynamics information UI, EI the platooning control device 20 determines a safe and fuel-saving second desired distance DSoll_B, which is determined by the distance control system 10. The specified second desired distance DSoll_B while travelling in a platoon 100 is conventionally less than the first desired distance DSoll_A, which can be set by the driver in the normal driving mode.

Figure 2A:
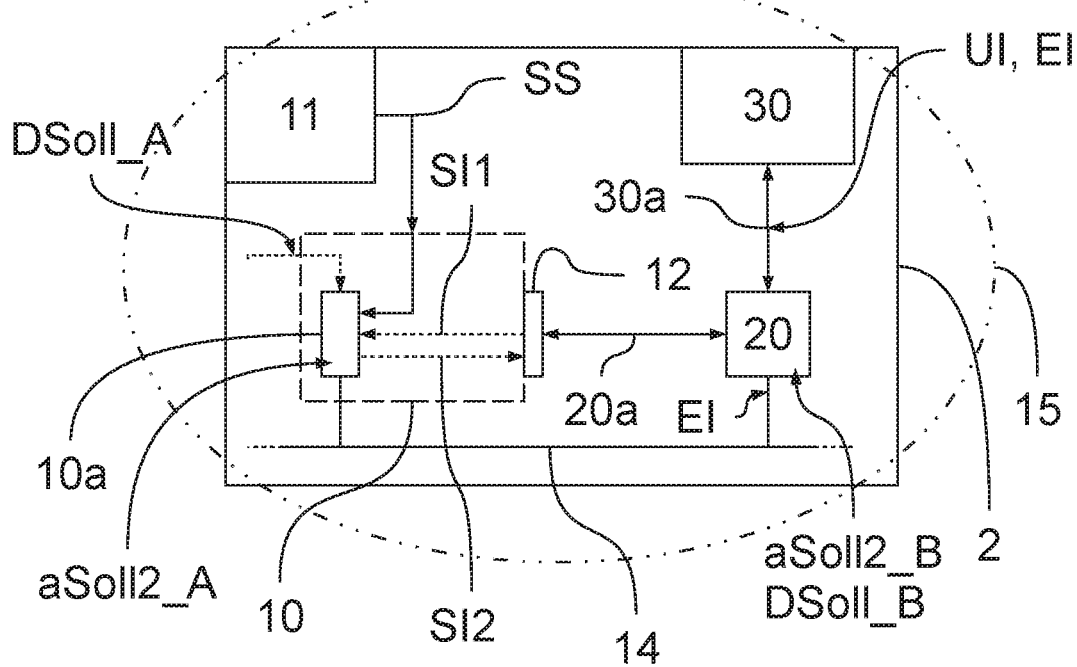
FIGS. 2a, 2b show control arrangements according to embodiments of the invention in detailed views.

According to a first embodiment, which is presented in FIG. 2$a$ in detail, for the transfer of the second desired distance DSoll_B from the platooning control device 20 to the distance control device 10$a$ an ACC-Interface 12 is arranged on the distance regulation system 10, by means of which a first interface signal SI1, which in particular transfers the second desired distance DSoll_B, is received and transferred to the distance control device 10$a$ and a second Interface signal SI2 can be output.

The ACC interface 12 is embodied, for example, as a standardized plug-in connection, into which can be plugged a platooning data line 20$a$ leading to the platooning control device 20 for transmission of the second desired distance DSoll_B from the platooning control device 20 to the ACC interface 12. Internally, the ACC interface 12 is directly connected to the distance control device 10$a$ in accordance with this embodiment in order to transfer the Interface signals SI1, SI2 internally.

In addition, with the platooning mode PM activated, the second subject vehicle desired acceleration aSoll2_B determined by the platooning control device 20 and output via the platooning data line 20$a$ to the ACC interface 12 is transferred to the distance control device 10$a$ by means of the first interface signal SI1. Said second subject vehicle desired acceleration aSoll2_B indicates the acceleration with which the second desired distance DSoll_B is to be regulated by the distance regulation system 10, i.e. the acceleration that the distance control device 10$a$ is to demand from the brakes and/or the drive. As a result, for example, in emergency braking situations a very high value of the second subject vehicle desired acceleration aSoll2_B and with only small distance changes a rather low value of the second subject vehicle desired acceleration aSoll2_B can be specified to the distance regulation system 10. Accordingly, the distance regulation system 10 does not necessarily have to intervene in the driving process in any situation with the parameterization defined in advance in the distance regulation system 10. As a result, comfort can be increased since gentler regulation adapted to the situation takes place which the driver does not perceive as jerky or annoying.

With the ACC interface 12, a conventional, independently operating distance regulation system 10 in the subject vehicle 2 can be extended by the possibility of receiving additional requirements or information via the first interface signal SI1 and transferring the same to the distance control device 10$a$ in order to carry out distance control therewith. With an interface extension and a software adaptation to the distance regulation system 10 or to the distance control device 10$a$, a conventional distance regulation system 10 can thus be used additionally in a platooning mode PM to adjust a second desired distance DSoll_B specified by the platooning control device 20 via the first interface signal SI1 or the specified second subject vehicle desired acceleration aSoll2_B by intervening in the brakes or the drive of the subject vehicle 2 without providing a control system operating in parallel with the distance regulation system 10 for this purpose.

The platooning control device 20 itself coordinates the driving behavior of the subject vehicle 2 when the platooning mode PM is activated by constantly checking how the subject vehicle 2 has to behave relative to the vehicle surroundings U in order to ensure fuel-efficient and safe and reliable driving of the subject vehicle 2. For this purpose, the platooning control device 20 evaluates driving dynamics information UI, EI in particular. On the one hand, driving dynamics information means surroundings information UI, i.e. driving dynamics information emanating from the vehicle surroundings U, in particular from the other vehicles 1, 3, and on the other hand driving dynamics information means subject vehicle information EI, i.e. driving dynamics information emanating from the subject vehicle 2.

Driving dynamics information, which is evaluated as subject vehicle information EI as well as surroundings information UI, is for the respective vehicle 1, 2, 3 for example a current actual acceleration aIst1, aIst2, aIst3, a desired acceleration aSoll1, aSoll2_A, aSoll2_B, aSoll3, i.e. an acceleration or braking requirement of the vehicle 1, 2, 3 or a brake performance parameter BP1, BP2, BP3, which indicates the in particular mass-dependent braking capacity of the respective vehicle 1, 2, 3. Based on said driving dynamics information, the current and future movement of the respective vehicle 1, 2, 3 in the platoon 100 can be estimated.

Upcoming events in the surroundings, e.g. a junction K, a traffic light A, an end of a tailback SE, a construction site B, speed limits G, etc. can also continue to be taken into account as surroundings information UI. In addition, overtaking bans, warnings of upcoming accidents, rescue vehicles, objects in the blind spot, overturning probabilities, warning messages of the subject vehicle 2, or similar are considered as surroundings information UI in order to make determination of the second target distance DSoll_B or the second subject vehicle target acceleration aSoll2_B as reliable as possible. All said events in the vehicle surroundings U can change constantly while driving in a platoon 100 and can therefore have a direct or indirect influence on the current and upcoming driving dynamics of the subject vehicle 2 but also on the vehicle ahead 1 and the vehicle behind 3.

The subject vehicle information EI can be transferred internally, for example from the distance control device 10a or via a CAN bus 14 to the platooning control device 20 for further processing. The surroundings information UI is transmitted to the subject vehicle 2 in a surroundings data signal SU by means of wireless data communication 21a, 21b provided by a communication system 30 in the subject vehicle 2 and is then transmitted via a communications data line 30a to the platooning control device 20. For example, a V2X communication system can be used as a communication system 30.

In this case, V2X (vehicle-to-x) means a wireless data connection 21a, 21b between the subject vehicle 2 and another vehicle 1, 3 in the vehicle surroundings U or an infrastructure device 31, 32, wherein the wireless data communication 21a, 21b between two vehicles is referred to as vehicle-vehicle (V2V) data communication 21a and between a vehicle and an infrastructure device as vehicle-infrastructure (V2I) data communication 21b.

The communication system 30 of the subject vehicle 2 is therefore able to wirelessly receive data regarding the current traffic situation of the closer vehicle surroundings U, in particular from the other vehicles 1, 3 or the infrastructure devices, e.g. an intelligent traffic sign 31, a fixed intelligent roadside station (IRS) 32 or the like as driving dynamics information, in particular using the standardized data protocol IEEE 802.11p, e.g. via WLAN, DSRC, LTE or the like. Said data are transferred to the platooning control device 20, which, depending on the above, determines a second desired distance ASoll_B and the second subject vehicle desired acceleration aSoll2_B and transfers the same via the ACC interface 12 to the distance regulation system 10 or the distance control device 10a.

Thus, for the distance control by the distance regulation system 10 in the platooning mode PM, surroundings information UI can also be included that cannot be detected directly or only at a later time by the sensor system 11 of the distance regulation system 10, which improves the safety and reliability of the distance control of the subject vehicle 2 by the distance regulation system 10 when driving in a platoon 100. Therefore the second subject vehicle desired acceleration aSoll2_B can already be specified predictively using the surroundings information UI where a second desired distance DSoll_B is specified by the platooning control device 20.

For example, if the vehicle ahead 1 initiates emergency braking, this is only recognizable by the sensor system 11 if a certain vehicle ahead actual acceleration aIst1 has been set. If the vehicle ahead 1 transmits the requirement for emergency braking, i.e. a certain vehicle ahead desired acceleration aSoll1, to the subject vehicle 2, but wirelessly via the V2V data communication 21a immediately when the emergency braking is initiated, the subject vehicle 2 can already react proactively by the platooning control device 20 processing said surroundings information UI and outputting a second subject vehicle desired acceleration aSoll_B dependent thereon to the distance control device 10a, which, for example, is roughly equal to the vehicle ahead desired acceleration aSoll1 in the current emergency braking situation. This can already be done before the emergency braking is detected by the sensor system 11 of the distance regulation system 10.

Hazards, events or warnings detected by the vehicle ahead 1, which originate from the vehicle surroundings U, or indications emanating from the infrastructure devices 31, 32, e.g. speed limits, construction site indications or the like, may already be processed by the platooning control device 20 in the subject vehicle 2 before such signs come into the field of view of the sensor system 11. In addition, the vehicle ahead brake performance parameter BP1 or the vehicle behind brake performance parameter BP3 compared to the subject vehicle brake performance parameter BP2 can be taken into account when determining the second subject vehicle desired acceleration aSoll2_B and the second desired distance DSoll_B in order not to risk a rear-end collision. These cannot be determined by the sensor system 11 of the subject vehicle 2.

In order to determine from which vehicle 1, 3 or from which infrastructural device 31, 32 of the vehicle surroundings U the wirelessly transmitted surroundings information UI was sent and thus whether said information UI is actually relevant for the subject vehicle 2 for the specification of the second desired distance DSoll_B and the second subject vehicle desired acceleration aSoll2_B, the platooning control device 20 checks whether said transmitted surroundings information UI can actually have an impact on the driving dynamics of the subject vehicle 2 in the platooning mode PM based on, for example, an identifier, a position, a direction, and a speed transmitted with the respective surroundings information UI. As a result, for example, oncoming vehicles or warning signs which are only relevant to oncoming traffic and have no influence on the subject vehicle 2 may not be taken into account.

In addition, the sensor signals SS obtained by means of the sensor system 11 of the distance regulation system 10 can also be evaluated in the platooning mode PM. As a result, a kind of plausibility checking can take place in that, for example, for the second desired distance DSoll_B specified by the platooning control device 20, the distance control device 10a checks the first subject vehicle desired acceleration aSoll2_A that would result while taking into account the current sensor signals SS and compares the first subject vehicle desired acceleration aSoll2_A obtained with the second subject vehicle desired acceleration aSoll2_B specified by the platooning control device 20 using the surroundings information UI. In the event of deviations critical to driving, this can be suitably taken into account internally.

Figure 2B:
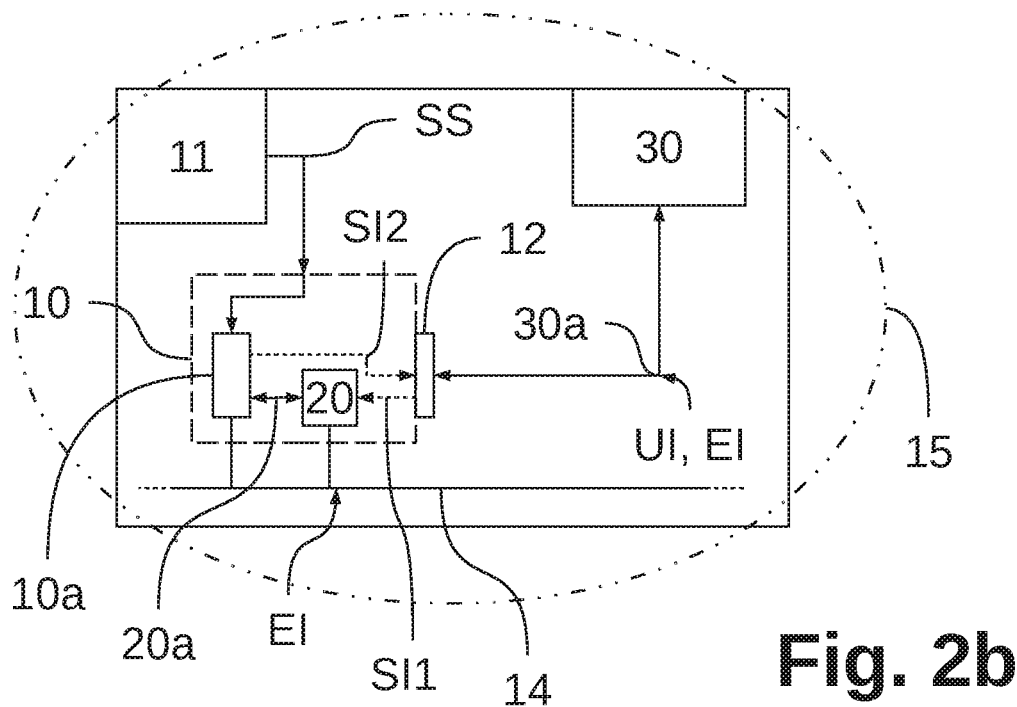

According to an alternative embodiment shown in FIG. 2b, the platooning control device 20 can also be integrated within the distance regulation system 10, for example also in the distance control device 10a as a software adaptation. In this case, the environment information UI received by the communication system 30 in the subject vehicle 2 is transmitted via the communication data line 30a to the ACC interface 12 and then internally in the distance regulation system 10 in the first interface signal SI1 to the platooning control device 20 integrated within the distance regulation system 10. The platooning control device 20 then determines the second desired distance DSoll_B and the second subject vehicle desired acceleration aSoll2_B as described above, which are transmitted via the platooning data line 20a to the distance control device 10a for implementation at the brakes or the drive of the subject vehicle 2. If the platooning control device 20 is integrated within the distance control device 10a, accordingly an internal signal processing is carried out that results in a requirement for the brakes and/or the drive.

The wirelessly received surroundings information UI can thus also be transmitted directly via the ACC interface 12 to the distance regulation system 10, which correspondingly evaluates the information internally and depending thereon carries out distance control. In general, thus all the wirelessly received information that is necessary for the platooning and the associated distance control can be transmitted via the ACC interface 12 to the distance regulation system 10, so that the existing hardware can also be used with the appropriate interface extension for the distance control that is required during platooning.

The platooning control device therefore evaluates said surroundings information inside or outside the distance regulation system and depending thereon outputs data to the distance control device 10*a*, which outputs the corresponding requirements for the brakes and/or the drive.

The distance regulation system 10, the ACC interface 12, the platooning control device 20 and the communication system 30 in the subject vehicle 2 are each part of a control arrangement 15, which is used as a whole for the safe and reliable adjustment of the desired distance DSoll_A, DSoll_B between the subject vehicle 2 and the vehicle ahead 1, and according to this embodiment in the platooning-mode PM in particular also carries out the control and coordination of the subject vehicle 2 within the platoon 100.

Instead of the platooning control device 20, however, in the control system 15 there may also be other assistance control devices 40 that can specify a second desired distance DSoll_B and a second subject vehicle desired acceleration aSoll2_B for distance control via an assistance data line 40*a* to the distance regulation system 10 or the distance control device 10*a* based on the surroundings information UI transmitted via the wireless data communication 21*a*, 21*b*.

The respective assistance control device 40 is then disposed outside the distance regulation system 10 or integrated within the distance regulation system 10, i.e. the correspondingly already processed or still unprocessed surroundings information UI is transferred via the ACC interface 12 to the distance regulation system 10. The calculation of the second desired distance DSoll_B and the second subject vehicle desired acceleration aSoll2_B, which is carried out inside or outside the distance regulation system 10 depending on the surroundings information UI, is used by the distance control device 10*a* for the distance control as already described, which is therefore also carried out depending on said surroundings information UI.

As an assistance control device 40, for example, a control device of an emergency braking system is also possible, which based on the surroundings information UI can specify in particular a second subject vehicle desired acceleration aSoll2_B for a certain second target distance DSoll_B, which is accordingly implemented by the distance regulation system 10.

In all embodiments, the second interface signal SI2 can be output via the ACC interface 12 in order to achieve further functionality of the control arrangement 15 disposed in the subject vehicle 2. Therefore, using the communication system 30 the subject vehicle information EI, e.g. the subject vehicle target acceleration aSoll2_A, aSoll_B demanded by the distance regulation system 10 or the manually or automatically specified desired distance DSoll_A, DSoll_B can also be wirelessly transmitted via the V2V data communication 21*a* to the other vehicles 1, 3 or via the V2I data communication 21*b* to the infrastructure devices 31, 32. The corresponding subject vehicle information EI is transferred to the communication system 30 in the second interface signal SI2 from the distance regulation system 10 or from the distance control device 10*a* via the ACC interface 12, possibly the assistance data line 40*a* and the communication data line 30*a*, and is output wirelessly from the communication system 30.

A desired distance DSoll_A, DSoll_B adjusted by the subject vehicle 2 as well as a subject vehicle desired acceleration aSoll2_A, aSoll2_B and possibly also a subject vehicle actual acceleration aIst2 can therefore be detected and evaluated in a timely manner by the other road users in the vehicle surroundings U in order to be able to safely and reliably coordinate and control the respective vehicles 1, 3, for example in the platoon 100 or in other driving situations. For example, the subject vehicle 2 can provide information that may not be directly or immediately detected by the other vehicles 1, 3 in the vehicle surroundings U, such as an imminent start of braking by the subject vehicle 2, which can only be perceived later by a vehicle behind 3. The vehicle behind 3 can then adapt the vehicle behind-actual acceleration aIst3 to the current driving situation by suitably specifying a vehicle behind desired acceleration aSoll3.

In addition, sensor signals SS detected by the sensor system 11 of the distance regulation system 10 can also be transmitted by means of the second interface signal SI2 to the communication system 30 in order to inform road users, for example in advance, of a specific event captured by the sensor system 11 that the other road users themselves may only be able to detect later. As a result, the respective other vehicle 1, 3 can react to such an event earlier.

The other vehicles of the platoon 100, i.e. the vehicle ahead 1 and the vehicle behind 3, have a comparable platooning control device 201, 203, a comparable distance regulation system 101, 103 as well as a comparable communication system 301, 303, each of which form a control arrangement 151, 153 in order to act and react as described for the subject vehicle 2. This means that comparable evaluation and forwarding of dynamics information are carried out in order to control the respective vehicle 1, 3.

Figure 3:
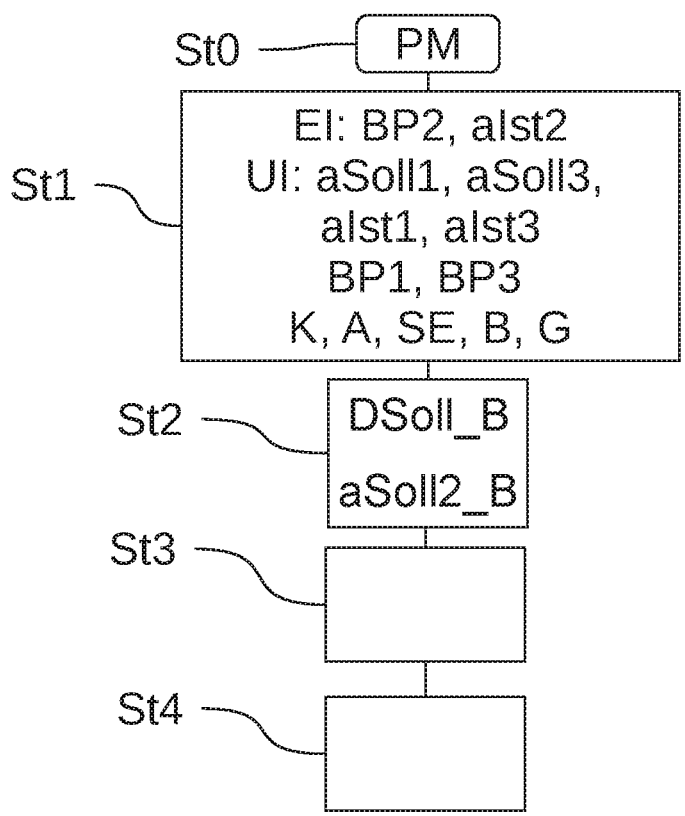
FIG. 3 shows a flowchart of a method according to an embodiment of the invention.

A method according to an embodiment of the invention can be implemented when using a platooning control device 20 for the coordination of the subject vehicle 2 in a platoon 100 according to FIG. 3, for example as follows:

In an initial step St0, the procedure is started, for example after it has been determined that the platooning mode PM is activated, i.e. it is intended to operate the subject vehicle 2 within a platoon 100, wherein coordination of the subject vehicle 2 in the platoon 100 is carried out by the platooning control device 20.

In a first step St1, the second desired distance DSoll_B and the second subject vehicle desired acceleration aSoll2_B to be adjusted with regard to the currently present driving dynamics situation in order to maintain safe and fuel-efficient driving operation of the subject vehicle 2 within the platoon 100 are determined depending on the aforementioned surroundings information UI wirelessly transmitted via the data communication 21*a*, 21*b* and depending on the aforementioned subject vehicle information EI from the platooning control device 20.

In a second step St2, the second desired distance DSoll_B as well as the second subject vehicle desired acceleration aSoll2_B as determined by the platooning control device 20 in the first step St1 are transmitted to the distance regulation system 10 or to the distance control device 10*a*. A first desired distance DSoll_A that may be manually specified by the driver will be overwritten in this case.

The transmission of the respective data in the first step St1 or in the second step St2 takes place via the ACC interface 12, wherein depending on whether the platooning control device 20 is integrated within the distance regulation system 10 or not, the surroundings information UI is already transmitted in the first step St1 or the second desired distance DSoll_B and the second subject vehicle desired acceleration aSoll2_B are only transmitted via the ACC interface 12 in the second step St2 as described above.

The distance regulation system 10 then demands the second subject vehicle desired acceleration aSoll2_B in a third step St3 by means of a brake intervention or an engine intervention in order to achieve the second desired distance DSoll_B, wherein optionally the sensor signals SS of a sensor system 11 as described above for example can also be taken into account for plausibility checking.

At the same time, in a fourth step St4 the second subject vehicle desired acceleration aSoll2_B as well as possibly further subject vehicle information EI is output via the wireless data communication 21a, 21b so that vehicles 1, 3 in the vehicle surroundings U can adjust thereto and react accordingly.

If the platooning mode PM is not activated, as in a conventional distance regulation system 10 control is carried out to a first desired distance DSoll_A that is manually specified by the driver of the subject vehicle 2. The adjustment of the first desired distance DSoll_A is then carried out with a first subject vehicle desired acceleration aSoll2_B, which is specified based on a parameterization previously determined in the distance regulation system 10, for example.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE CHARACTER LIST

1 Vehicle ahead
2 Subject vehicle
3 Vehicle behind
10 Distance regulation system in the subject vehicle 2
10a Distance control device
11 Sensor system
12 ACC interface
14 CAN bus
15 Control arrangement
20 Platooning control device in the subject vehicle 2
20a Platooning data line
21a Wireless V2V data communication
21b Wireless V2I data communication
30 Communication system in the subject vehicle 2
30a Communication data line
31 Intelligent traffic signs
32 Intelligent traffic station
40 Assistance control device
40a Assistance data line
100 Platoon/convoy
101 Distance control system in the vehicle ahead 1
103 Distance control system in the vehicle behind 3
151 Control arrangement in the vehicle ahead 1
153 Control arrangement in the vehicle behind 3
201 Platooning control device in the vehicle ahead 1
203 Platooning control device in the vehicle behind 3
301 Communication system in the vehicle ahead 1
303 Communication system in the vehicle behind 3
A Traffic light
aIst1 Vehicle ahead actual acceleration
aIst2 Subject vehicle actual acceleration
aIst3 Vehicle behind actual acceleration
aSoll1 Vehicle ahead desired acceleration
aSoll2_A First subject vehicle desired acceleration
aSoll2_B Second subject vehicle desired acceleration
aSoll3 Vehicle behind desired acceleration
B Construction site
BP1 Vehicle ahead brake performance parameter
BP2 Subject vehicle brake performance parameter
BP3 Vehicle behind brake performance parameter
DIst Actual distance
DSoll_A First desired distance
DSoll_B Second desired distance
EI Subject vehicle information
G Speed limit
K Junction
PM Platooning Mode
SE End of tailback
SS Sensor signal
SI1 First interface signal
SI2 Second interface signal
SU Surroundings data signal
U Vehicle surroundings
UI Surroundings information,

The invention claimed is:

1. A control arrangement for adjusting a desired distance between two vehicles, the control arrangement comprising:
an adaptive cruise control (ACC) distance regulation system having a distance control device configured, in a normal operation mode, to adjust a first desired distance between a subject vehicle and a vehicle ahead depending on sensor signals received from a sensor system by requesting a first subject vehicle desired acceleration;
a communication system configured to wirelessly send and receive a surroundings data signal, wherein the surroundings data signal contains surroundings information; and
an assistance control device configured to determine a second desired distance between the subject vehicle and the vehicle ahead and a second subject vehicle desired acceleration for adjusting the second desired distance depending on the surroundings information received from the communication system, wherein the surroundings information comprises at least one of a vehicle ahead acceleration, a hazard, an event, and a warning recognized by the vehicle ahead or received from an infrastructure device, wherein the assistance control device comprises a platooning control device for coordinating the subject vehicle within a platoon of several vehicles, wherein the platooning control device is configured to determine, in an activated platooning mode, the second desired distance of the subject vehicle from the vehicle ahead and the second subject vehicle desired acceleration for adjusting the second desired distance depending on the surroundings information and to output the same, the platooning control device being configured to increase safety and fuel efficiency of the subject vehicle while in the activated platooning mode when the subject vehicle is traveling in the platoon of several vehicles, wherein the distance regulation system comprises an ACC interface, wherein a first interface signal is transferred via the ACC interface to the distance regulation system from the platooning control device, wherein the first interface signal is formed depending on the surroundings information received from the communication system and the second desired distance determined by the platooning control device is adjusted by the distance regulation system taking into account the first interface signal, wherein the second desired distance between the subject vehicle and the vehicle ahead and the second subject vehicle desired acceleration are determined by the assistance control device depending on subject vehicle information, wherein for this purpose the assistance control device is connected to a CAN bus of the subject vehicle which provides the subject vehicle information, and wherein a second interface signal is output via the ACC interface, wherein the second interface signal contains the subject vehicle information and the second interface signal is transferred to the communication system via at least one wired communication bus, and wherein the communication system thereafter wirelessly provides the subject vehicle information to other vehicles or infrastructure devices in the vehicle surroundings.

2. The control arrangement as claimed in claim 1, wherein the assistance control device is connected for signal transmission to the ACC interface via an assistance data line for transmitting the second desired distance and the second subject vehicle desired acceleration as determined by the assistance control device to the ACC interface, so that the second desired distance and the second subject vehicle desired acceleration can be transferred to the distance control device by the first interface signal.

3. The control arrangement as claimed in claim 1, wherein the assistance control device is integrated into the distance regulation system and the assistance control device is connected via an assistance data line to the distance control device for signal transmission for transmitting the second desired distance and the second subject vehicle desired acceleration determined by the assistance control device to the distance control device, and wherein the ACC interface is connected to the assistance control device for signal transmission and the first interface signal contains the surroundings information received from the communication system.

4. The control arrangement as claimed in claim 3, wherein the ACC interface is connected to the communication system via a communication data line for transmitting the surroundings information to the ACC interface.

5. The control arrangement as claimed in claim 1, wherein the first desired distance can be specified by a driver of the subject vehicle.

6. The control arrangement as claimed in claim 1, wherein the communication system provides wireless data communication for transmitting the surroundings data signal, and wherein the wireless data communication is formed by wireless V2V data communication between the vehicle and other vehicles in the vehicle surroundings and/or by wireless vehicle V2I data communication between the vehicle and infrastructure devices in the vehicle surroundings.

7. The control arrangement as claimed in claim 1, wherein the surroundings data signal transfers a vehicle ahead actual acceleration and/or a vehicle behind actual acceleration and/or a vehicle ahead desired acceleration and/or a vehicle behind desired acceleration and/or a vehicle ahead brake performance parameter and/or vehicle behind braking parameter and/or an upcoming intersection, a traffic light, a tailback, a construction site or a speed limit as surroundings information to the communication system.

8. The control arrangement as claimed in claim 1, wherein the subject vehicle is configured to include the control arrangement.

9. The control arrangement as claimed in claim 1, wherein the subject vehicle information comprises a subject vehicle actual acceleration and/or the first subject vehicle desired acceleration and/or the second subject vehicle desired acceleration and/or a subject vehicle brake performance parameter.

10. The control arrangement as claimed in claim 1, wherein the second interface signal contains the sensor signals of the sensor system of the subject vehicle for wirelessly providing the sensor signals to other vehicles or infrastructure devices in the vehicle surroundings.

11. A method for adjusting a distance between two vehicles, the method comprising:
capturing surroundings information by a communication system;
determining, using an assistance control device comprising a platooning control device for coordinating a subject vehicle within a platoon of several vehicles, a second desired distance between the subject vehicle and a vehicle ahead and a second subject vehicle desired acceleration for adjusting the second desired distance depending on the captured surroundings information, the platooning control device being configured to increase safety and fuel efficiency of the subject vehicle while in an activated platooning mode when the subject vehicle is traveling in the platoon of several vehicles;
transferring the second desired distance and the second subject vehicle desired acceleration to the distance regulation system via an ACC interface, and
using the determined second desired distance and the second subject vehicle desired acceleration as a specification to a distance regulation system in the subject vehicle for adjusting the second desired distance in the activated platooning mode,
wherein the distance regulation system is configured, in a normal operation mode, to request a manually specified first desired distance between the subject vehicle and the vehicle ahead depending on sensor signals received from a sensor system by requesting a first subject vehicle desired acceleration, wherein the surroundings information is wirelessly transmitted to the subject vehicle and subject vehicle information is output and wirelessly transmitted to other vehicles or infrastructure devices in the vehicle surroundings, and wherein the surroundings information comprises at least one of a vehicle ahead acceleration, a hazard, an event, and a warning recognized by the vehicle ahead or received from an infrastructure device.

12. The method as claimed in claim 11, wherein the requirement for the first desired distance is overwritten if a second desired distance dependent on the surroundings information is specified to the distance regulation system.

13. The method according to claim 11, wherein the second subject vehicle desired acceleration determined depending on the surroundings information is plausibility checked using sensor signals output by the sensor system of the distance regulation system.

14. The method according to claim 11, wherein the distance regulation system can specify a positive and a negative subject vehicle desired acceleration.

\* \* \* \* \*